United States Patent [19]

Clarke et al.

[11] Patent Number: 5,550,914
[45] Date of Patent: Aug. 27, 1996

[54] COMMUNICATIONS SIGNALLING NETWORK APPARATUS

[76] Inventors: David A. Clarke, 75 Dorset Way, Yate Bristol; Steven N. Bennett, 1 Bafford Farm, Bafford Lane, Charlton Kings, Cheltenham, both of England

[21] Appl. No.: 389,925

[22] Filed: Feb. 16, 1995

[30] Foreign Application Priority Data

Feb. 25, 1994 [EP] European Pat. Off. .............. 94301351

[51] Int. Cl.$^6$ .............................. H04M 3/42; H04M 7/06
[52] U.S. Cl. ...................... 379/230; 379/207; 379/229; 379/221; 379/242; 379/246; 379/219; 379/220; 370/58.2; 370/85.6
[58] Field of Search .................................. 379/219, 220, 379/221, 229, 230, 242, 243, 244, 245, 246, 207, 112, 114, 34; 370/85.6, 58.2

[56] References Cited

U.S. PATENT DOCUMENTS

| | | | |
|---|---|---|---|
| 4,953,203 | 8/1990 | Shepard | 379/207 |
| 5,077,735 | 12/1991 | Myung et al. | 370/110.1 |
| 5,295,183 | 3/1994 | Langlois et al. | 379/113 |
| 5,425,086 | 6/1995 | Hidaka et al. | 379/230 |
| 5,430,719 | 7/1995 | Weisser, Jr. | 370/58.2 |
| 5,438,568 | 8/1995 | Weisser, Jr. | 379/96 |
| 5,438,570 | 8/1995 | Karras et al. | 370/94.2 |
| 5,448,632 | 8/1995 | Iyob et al. | 379/221 |
| 5,450,483 | 9/1995 | Williams | 379/221 |
| 5,452,350 | 9/1995 | Reynolds et al. | 379/220 |
| 5,457,729 | 10/1995 | Hamann et al. | 379/2 |

FOREIGN PATENT DOCUMENTS

0549127A2  6/1993  European Pat. Off. .

OTHER PUBLICATIONS

"Security Probes a New Security Tool For Communication Systems" RMS Information and Computer Security 20 Mar. 1994 Pierre Rolin.

"Bellcore Technical Reference" Generic Requirements For Manual Link Set Blocking Controls Supporting Node and Network Isolation Actions at Common Channel Signaling (CCS) Network Nodes Jan. 1994 p. 6.

"Performance Analysis, traffic engineering and congestion controls for ISDN systems" IEEE/IEICE Global Telecommunications Conference Session 14, paper 5, vol. 1, 15 Nov. 1987, Tokyo JP pp. 538–544.

"Traffic Routing and Performance Analysis of the Common Channel Signaling System 7 Network" by Johathan L. Wang, Globecom 91, Session 10, paper 3, pp. 301–305, XP325989.

"Common Channel Signalling System No. 7 for ISDN and Intelligent Networks" by B. Jabbari. Proceedings of the IEEE, vol. 79, No. 2, Feb. 1991, pp. 155–169. XP226399.

European Search Report 29 Jul. 1994.

*Primary Examiner*—Jeffery Hofsass
*Assistant Examiner*—Parag Dharia

[57] ABSTRACT

A message interceptor is interposed in a link of a communications signalling network such as an SS7 network. The interceptor separately maintains the link level protocols on the two portions of the link with which it interfaces. Message data is transferred across between the link portions by a transfer circuit of the interceptor. In the course of this transfer, the nature of the data is checked by a selective action control circuit against selection criteria held in a store. If a selection criteria is met, the control circuit acts to suppress or modify the data.

17 Claims, 7 Drawing Sheets

5,550,914

COMMUNICATIONS SIGNALLING NETWORK APPARATUS

TECHNICAL FIELD

This invention relates to a message interceptor for a communications signalling network, and in particular, but not exclusively, to a message interceptor for use with a signalling network operating substantially in accordance with Signalling System No.7, whether as specified by the CCITT, ANSI, ETSI (for GSM), Bellcore or similar body, such a network being herein referred to as an SS7 network. The CCITT Signalling System Number 7 is specified in Recommendations Q.700-Q.716 CCITT Volume VI-Fascicle VI.7, Geneva 1989, ISBN 92-61-03511-6 which is herein incorporated by reference.

BACKGROUND ART

In modern communications technology it has become common practice to provide two related but separate network infrastructures: a transmission network for carrying enduser data traffic, and a signalling network for controlling operation of the transmission network in accordance with control signals transferred through the signalling network. In practice such signalling networks comprise high-speed computers interconnected by signalling links; computer programs control the computers to provide a set of operational and signalling functions in accordance with a standardized protocol. One example of such a signalling protocol is the afore-mentionned Signalling System No. 7 (SS7) which is being extensively deployed for control of telephone and other data transmission networks. An SS7 network basically comprises various types of signalling points, namely, signalling end points (SEPs) and signalling transfer points (STPs) interconnected by signalling links, the SEPs being associated for example with respective service switching points (SSPs) of the transmission network, and service control points (SCPs). Congestion may arise in the signalling network as a result, for example, of a number of SEPs simultaneously wishing to pass messages to another SEP (such as an SCP providing a database resource to the network). In this case, the links to the target SEP may not be able to handle the concentration of message traffic. To manage such possible congestion, the SS7 protocol provides a congestion control mechanism by which when a message is received in the outgoing buffer of a link causing the buffer to be filled to an upper-threshold level, a choking message is sent back to the SEP that generated the message, temporarily requiring it not to send any more messages to the same destination. When the buffer level falls below a lower threshold, the link is taken as no longer congested. This congestion control mechanism is primarily operated in the signalling transfer points.

A drawback with such a congestion control mechanism is that it is non-selective in nature—once congestion occurs in a link, choking messages are issued in response to all subsequently received messages until the link becomes non-congested, regardless of the origin, destination or content of the messages.

One possible way of reducing congestion would be to introduce a selective restriction mechanism in each existing signalling point that restricted the flow of certain predetermined types of messages, such as messages originating from a particular signalling point or concerning a particular called party. Such a mechanism would, for example, prevent more than a given number of messages from an originating signalling point from passing through a particular network node in unit time. A drawback of this mechanism is that it requires analysis of the messages and this causes processing overhead in the signalling points. Such overhead is particularly undesirable where the existing signalling point is a network resource such as an SCP because it is such resources that are the likely bottlenecks in the system.

Indeed, it would be useful generally to reduce the processing load of signalling points such as SCP, as this would enable them to handle more messages per unit time and improve overall network performance.

It is therefore an object of the present invention to provide a selective message restriction apparatus that does not require processing overhead in the existing signalling points. A separate objective of the present invention is to provide apparatus that can remove certain processing tasks from the existing network signalling points, particularly signalling end points.

SUMMARY OF THE INVENTION

According to the present invention, there is provided a message interceptor for a communications signalling network of the type comprising a plurality of signalling points interconnected by bi-directional point-to-point links over which messages are passed to transfer data between the signalling points, the passing of messages over each said link being effected in accordance with a link-level protocol; the message interceptor being intended for insertion in a said link between a first and a second said signalling point and comprising:

a first link interface for interfacing with a first portion of said link that connects with said first signalling point, a first link-level protocol engine connected to said first link interface for implementing said link-level protocol in respect of messages exchanged with said first signalling point over said first link portion, said first link-level protocol engine having means for extracting data carried in the messages received from said first signalling point and means for incorporating other data into messages for sending to said first signalling point, a second link interface for interfacing with a second portion of said link that connects with said second signalling point, a second link level protocol engine, connected to said second link interface for implementing said link-level protocol in respect of messages exchanged with said second signalling point over said second link portion, said second link-level protocol engine having means for extracting data carried in the messages received from said second signalling point and means for incorporating other data into messages for sending to said second signalling point, first transfer means for transferring data extracted by said first link-level protocol engine to said second link-level protocol engine for incorporation into messages thereby, and second transfer means for transferring data extracted by said second link-level protocol engine to said first link-level protocol engine for incorporation into messages thereby, at least one of said transfer means including storage means for storing predetermined selection criteria, and selective-action means for effecting at least one of the following actions:

modification of particular data being transferred between said protocol engines, suppression of the transfer of particular data between said protocol engines, the said selective-action means being responsive to the data to be transferred by the transfer means to effect a said action only on data meeting a corresponding said selection criterium held in said storage means.

Thus, the message interceptor is inserted directly in a link and carries out its selective action functions independently of the signalling point at the ends of the link: these are therefore relieved of processing overhead for carrying out these functions. This overhead could be substantial particularly in respect of data modification such as encryption/decryption or syntax translation for database access.

It may be convenient to give the message interceptor its own signalling network identity (its own signalling point code) in order to facilitate certain monitoring and management functions. Although in this case the message interceptor itself forms a signalling point, it is still appropriate to view the message interceptor as being inserted in a link between two other signalling points and the message interceptor still gives the noted advantages for the signalling points between which it is inserted.

The message interceptor can simply be arranged to effect messages suppression for selected messages received in one direction along the link. Alternatively, the message interceptor can be arranged to selectively effect suppresion and modification actions on messages passing in both directions along the link. Other combinations of action capability and direction of application are also possible.

In signalling networks, such as an SS7 network, where sequence numbers are applied to messages at the link level and acknowledgements are returned based on these numbers, it is the task of the link-level protocol engines of the message interceptor to ensure that the integrity of the sequence number and acknowledgement flows is maintained. However, it should be noted that this is done separately between the first signalling point and message interceptor and between the message interceptor and second signalling point. The suppression of a message by the interceptor thus causes no problems as the message is acknowledged as received over the link portion over which it reached the message interceptor, whilst it makes no appearance on the other link portion.

Typically, the data extracted by the interceptor's protocol engines from at least some of the messages received thereby comprises at least one of the following data items:

the identity of the signalling point from which the message originated;

the identity of the intended destination signalling point of the message;

the identity of the communications user number being called;

the identity of a communications user number of a calling party;

a data type indicator indicating the type of data contained in other data items extracted from the same message, In this case, where the selective-action means performs a suppression action, this will be on data extracted from messages with data items meeting selection criteria based on at least one of the following:

(a) a pre-selected value or range of values of a said data item, (b) a combination of data items with respective preselected values or range of values, (c) a preselected threshold number of messages received in unit time with data items meeting criteria according to one of (a) and (b) above, (d) a preselected threshold ratio determined over unit time between the number of messages meeting first criteria according to one of (a) and (b) and the number of messages meeting second criteria according to one of (a) and (b) above.

Thus, for example, the message interceptor can be set to allow through only a given number of call set up messages in unit time from a particular source.

Where the message interceptor is arranged to suppress messages carrying request data specifying a request (such as call set up) to which a response is expected, the selective-action means preferably includes means operative in the event of said request data being suppressed to pass response data to the link-level protocol engine providing the request data, the said protocol engine receiving the response data incorporating it in a message the destination of which is set to the signalling point originating the request. In this way, a rapid and clean request refusal can be achieved, minimising processing within the signalling points.

Advantageously, where the data carried by the messages includes link control data relevant to operation of the link carrying the messages, the transfer means is arranged to pass the link control data between the protocol engines without modification or suppression. In this manner, overall link control is unaffected by the presence of the message interceptor.

In respect of the data modification action capability of the message interceptor (such as encryption), the selection criteria associated with the first and second transfer means are preferably such that data relating to link control and message routing is not subject to modification action by said selective-action means.

Advantageously, the storage means storing the selection criteria is programmable and includes an external interface enabling the selection criteria to be downloaded into the storage means together with an indication of the associated action to be taken where more than one action is possible by said selective-action means.

Generally, multiple message interceptors will be deployed in a single network. A typical application would be to insert a respective message interceptor in each of the links connecting with a particular signalling point in order either to prevent overloading of that point (by message suppression) or to effect a processing task (encryption/decryption; syntax translation) on messages exchanged with that signalling point.

In this case, common programming means are preferably provided for programming the same selection criteria into the storage means of all the message interceptors associated with the signalling point.

Advantageously, the interceptor is intended to operate with a signalling network compliant with at least SS7 level 3. Indeed, the transfer means can advantageously include SS7 level 3 functionality for handling network-level issues, though in this case the message interceptor needs to be allotted a signalling point code as already envisaged above.

BRIEF DESCRIPTION OF DRAWINGS

A message interceptor embodying the present invention will now be described, by way of non-limiting example, with reference to the accompanying drawings, in which.

BEST MODE FOR CARRYING OUT THE INVENTION

Figure 1:
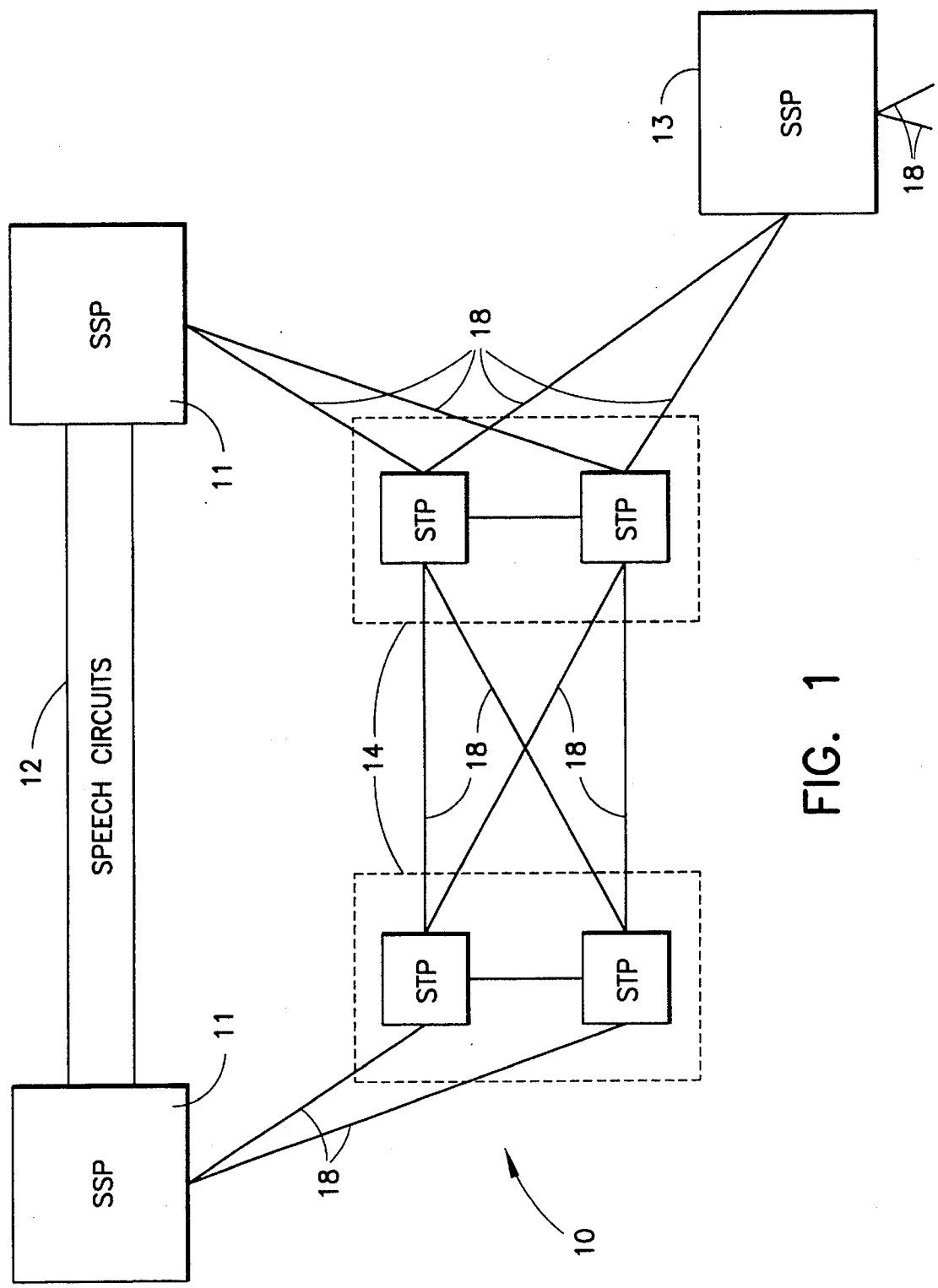
FIG. 1 is a schematic diagram of a part of an SS7 signalling network.

Referring to FIG. 1, an SS7 network 10 is shown intercommunicating three signalling end points constituted by two service switching points SSPs 11 (between which pass speech circuits 12 of a transmission network not further illustrated) and a service control point SCP 13 that can control the operation of the SSPs to provide special services. The SS7 network 10 includes two pairs 14 of signalling transfer points STPs, and a plurality of link sets 18 interconnecting the SSPs, SCP and STPs into a redundant network. Each signalling link set 18 is made up of one or more individual signalling links, the number of signalling links in a link set being chosen to provide appropriate capacity for the level of signalling traffic expected. The redundancy provided in respect of the STPs and links is to ensure that the failure of a single component of the network core does not cause the whole network to fail.

It should be noted that an SS7 network will typically comprise more STP pairs, SSPs and SCPs than illustrated.

Messages traversing the links of the network may be any of a large number of different types, depending on the nature of the call to which the message relates and the function specified by the message.

In order to facilitate an understanding of the present invention, a brief review will first be given of the layered structure of the SS7 architecture and of the messages passed over the links of the network 10 to implement the SS7 architecture.

Figure 2:
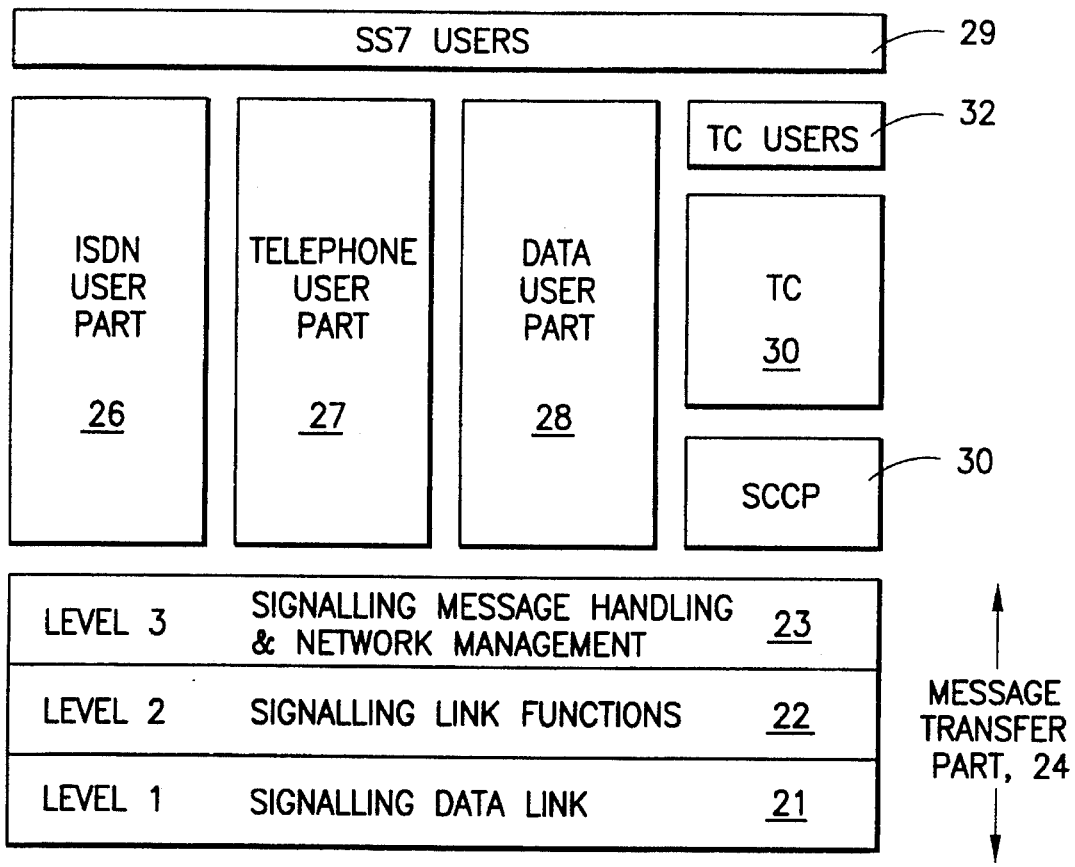
FIG. 2 is a diagram illustrating the overall SS7 architecture.

FIG. 2 illustrates the SS7 architecture. Levels 1 to 3 (referenced 21, 22, 23) form the message transfer part (MTP) 24. The MTP 24 is responsible for transferring signalling information between signalling points in messages. Level 4 (not referenced as a whole) comprises circuit-related user parts, namely ISDN User Part 26, Telephone User Part 27, and Data User Part 28. These user parts define the meaning of the messages transferred by the MTP 24 and provide functionality to the users of SS7 (block 29).

The user parts 26, 27, 28 are specific to particular types of circuit-related applications as indicated by their names. Level 4 also includes functional elements defining a general protocol for non-circuit-related information, such as operations, maintenance and administration information or network database information (provided, for example, from an SCP 13). The main functional element in this Level 4 protocol is the Transaction Capabilities (TC) 30 which sits on top of a Signalling-Connection-Control Part (SCCP) 31 and beneath a TC Users element 32. The SCCP 31 actually forms part of the transfer mechanism for non-circuit-related applications, combining with MTP 24 to provide a transfer mechanism meeting the OSI Layer 3/4 boundary requirements.

Considering the MTP 24 in a little more detail, Level 1 (reference 21) defines the physical, electrical and functional characteristics of the transmission path for signalling. MTP Level 2 (reference 22) defines the functions and procedures for the transfer of signalling messages over a link between two directly-connected signalling points. MTP Level 3 (reference 23) provides functions for the reliable transfer of signalling information from one signalling end point to another. Thus, Level 3 is responsible for those functions that are appropriate to a number of signalling links, these being separable into signalling-message handling functions and signalling-network management functions.

When considering the passing of messages over a single link, it is the combination of Levels 1 and 2 that provides for the reliable transfer of signalling information. The Level 2 functions provide a framework in which the information is transferred and performs error-detection and error-correction processes; the Level 2 functions are carried out afresh on a link-by-link basis. At Level 2, information is seen as being transferred between signalling points in messages known as "signal units".

Figure 3:
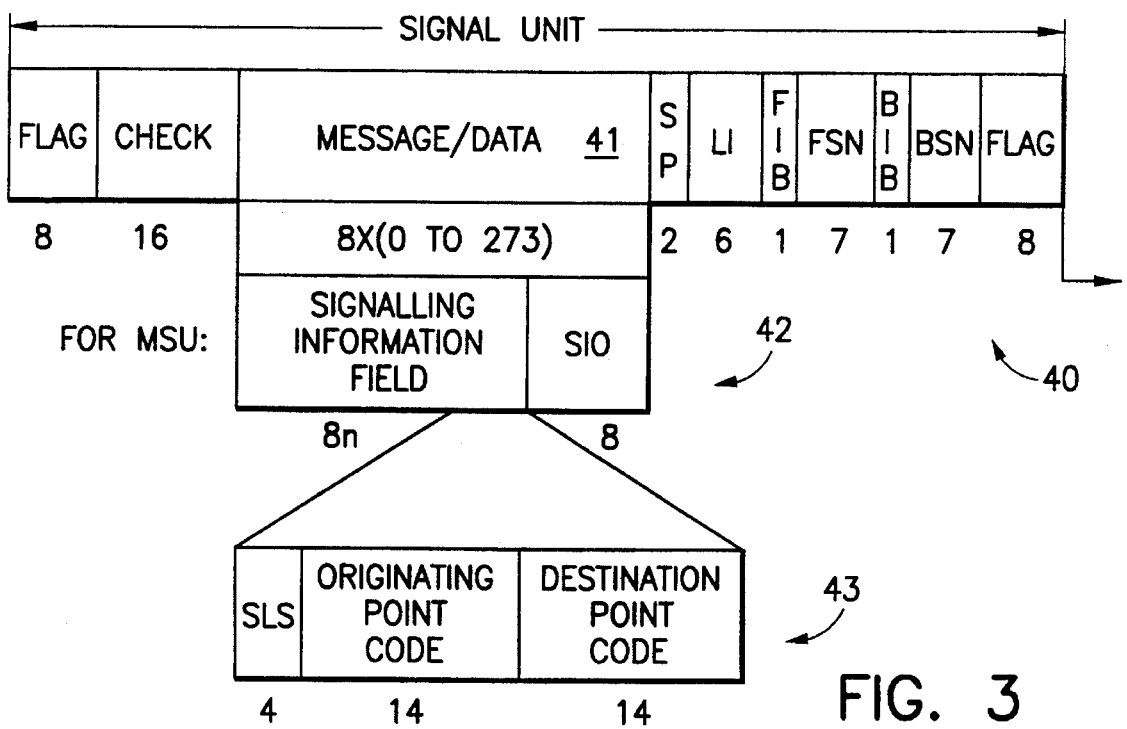
FIG. 3 is a diagram showing the general form of a signal unit used for transferring information across links in an SS7 network.

The general form of a signal unit 40 is shown in FIG. 3. As can be seen, a field 41 carrying message/data is encapsuled in a Level 2 framework comprising the following fields:

an 8-bit flag field;

a 7-bit backward sequence number field (BSN);

a backward-indicator bit (BIB);

a 7-bit forward sequence number field (FSN);

a forward-indicator bit (FIB);

a 6-bit length indicator field (LI);

a spare 2-bit field (SP);

a 16-bit check field; and an 8-bit terminating flag field.

The FSN, FIB, BSN, BIB and check fields provide error correction functionality at link level in a manner well understood by persons skilled in the art.

There are three types of signalling unit:

MSU—the Message Signal Unit—MSUs carry all service/application data sent on the SS7 network. The amount of data per MSU is limited to 273 octels maximuln.

LSSU—the Link Status Signal Unit—LSSUs carry information relating to the status of the link and are therefore concerned with Level 2 functions. Normally, LSSUs are only seen during the initial alignment procedure when a link is brought into service but are used at other times, for example, to stop the flow of signal units when processors are busy.

FISU—the Fill-In Signal Unit—When no MSUs or LSSUs are to be sent, a signalling point continually sends FISUs. FISUs carry basic Level 2 information only, for example, the acknowledgement of the last MSU (field 41 is empty).

The length indicator (LI) within each message indicates the signal unit type:

LI=0 means FISU

LI=1 or 2 means LSSU

LI=3 or more means MSU.

FIG. 3 illustrates at 42 the basic format of an MSU; as can be seen, it comprises a service information octet SIO of 8 bits and a signalling information field SIF of 8n bits, where n is a positive integer. The SIO field includes a Service Indicator sub-field that defines the user part or equivalent appropriate to the message. The SIF contains the information being transferred and will generally include a routing label 43 comprising a 14-bit destination point code indicating the destination signalling end point, a 14-bit originating point code indicating the originating signalling end point, and a 4-bit signalling link selection field for specifying a particular link in cases where two signalling points are linked by a multiple-link link set. The MTP 24 is not aware of the contents of the SIF other than the routing label.

As an example of the information that may be borne by an MSU, where a call is being set up, the first message to be sent is an initial-address message (IAM) which will contain the required address (e.g. the digits dialled by the calling customer). Other MSUs may contain the address of the calling party.

Figure 4:
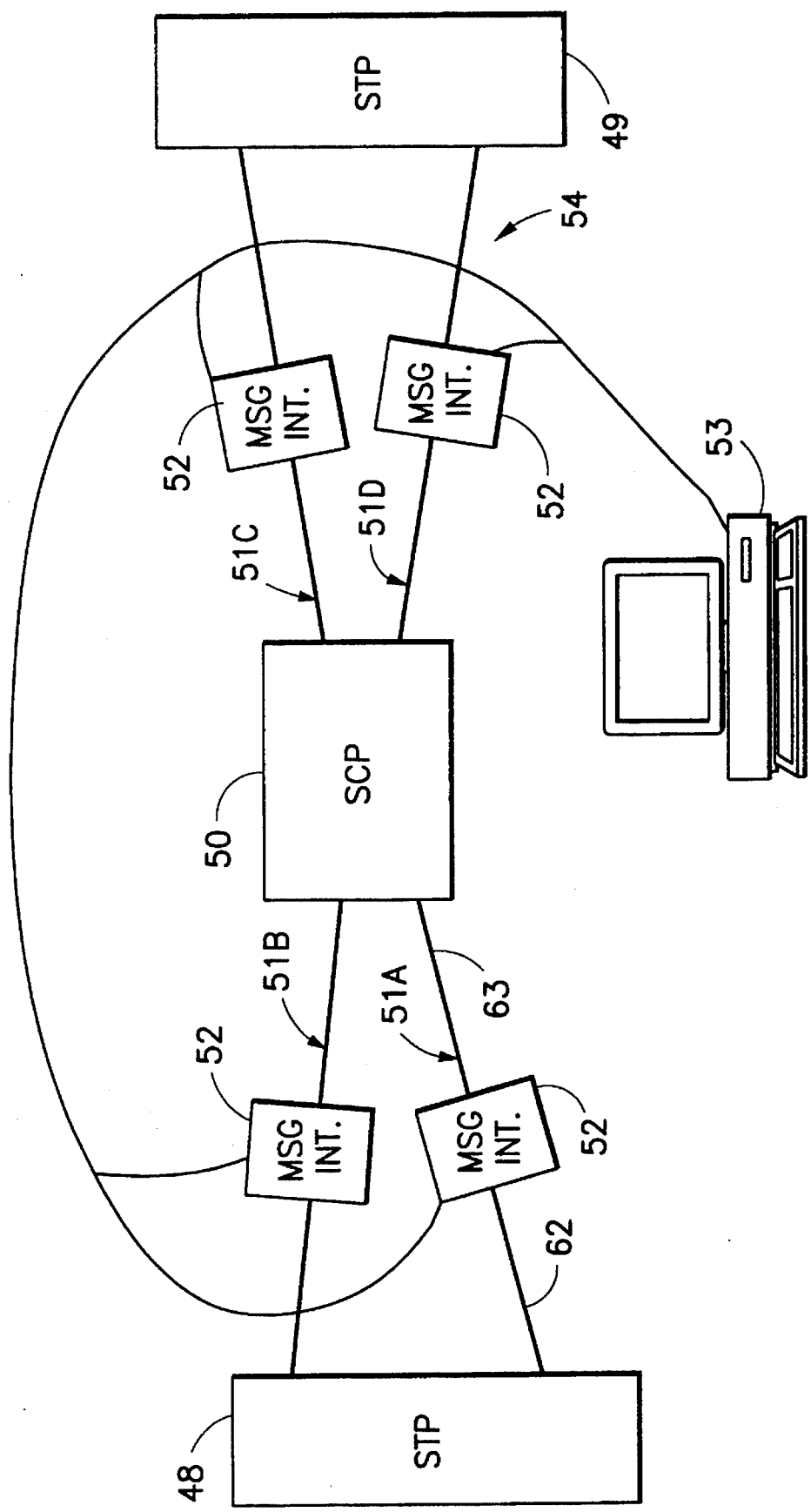
FIG. 4 is a diagram illustrating the deployment of several message interceptors embodying the invention to protect/ assist an SCP such as illustrated in the FIG. 1 network.

Turning now to a consideration of the present invention, FIG. 4 shows an SCP 50 (such as the SCP 13 of FIG. 1) to which four links 51 A,B,C,D are connected. Links 51A and 51B belong, for example, to a link set connecting SCP 50 with an STP 48 whilst links 51C and 51D may belong to further link set connecting SCP 50 with an STP 49. Inserted in each link 51 A,B,C,D is a respective message interceptor 52 embodying the present invention. Each message interceptor 52 is operative to monitor the messages on the link in which it is inserted, and to take predetermined action on detecting messages that meet pre-specified selection criteria. The selection critera are programmed into the message interceptor 52 from a remote station 53 over a LAN 54.

If the purpose of the message interceptors 52 is to protect the SCP 50 from overload, the action taken by each interceptor 52 will be to selectively suppress messages from the corresponding link before they reach the SCP. On the other hand, if the purpose of the message interceptors 52 is to relieve the SCP of particular processing tasks (such as decryption of incoming messages and encryption messages), then each message interceptor 52 will act to modify each message it receives that meets the predetermined selection criteria.

Each message interceptor may, in fact, be operative to effect both a message suppression action and a message modification action, each action being triggered by a different set of criteria.

Figure 5:
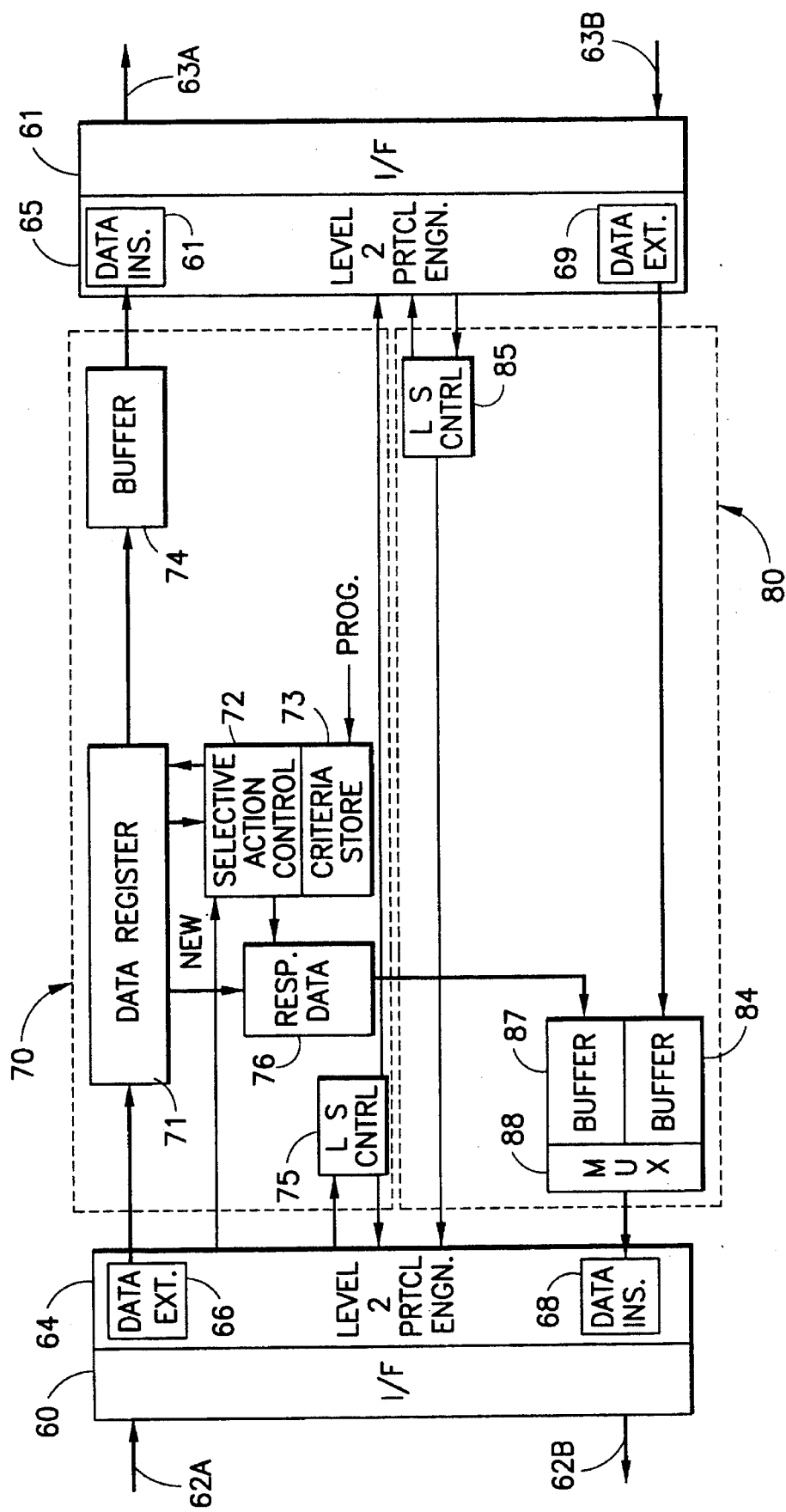
FIG. 5 is a functional diagram of a first form of the message interceptor intended to remove selected signal units passing in one direction along a link.

FIG. 5 is a functional block diagram of a first form of message interceptor 52 that is intended simply to suppress particular messages sent in one direction along a link.

The message interceptor 52 of FIG. 5 comprises two interfaces 60, 61 interfacing with respective portions 62, 63 of the link in which the interceptor is inserted (here assumed to be link 51A for convenience). Each link portion 62, 63 comprises two unidirectional channels 62A, B and 63A, B. In the present case, it is assumed that the channel 62A and 63A are inbound toward the SCP 50 and the 62B and 63B are outbound from the SCP.

Interfaces 60, 61 provide an MTP Level 1 interface to the corresponding link portions.

Associated with each interface 60, 61 is a respective Level 2 protocol engine 64, 65. The protocol engines 64, 65 act generally in the same manner as standard Level 2 protocol engines for MTP and will typically each be a hardware/firmware implementation of an appropriate state machine. Each protocol engine 64, 65 includes a respective data extraction circuit 66, 67 for extracting the Level 3 information from each MSU received at the corresponding interface. Each protocol engine 64, 65 also includes a data insertion circuit 68, 69 for inserting Level 3 information supplied to it into a MSU for outward transmission through the corresponding interface.

In addition, each protocol engine 64, 65 is operative to output a signal indicative of each LSSU received over the link portion 62A, 63B respectively, notwithstanding that normally such LSSUs generally have no direct visibility beyond Level 2.

A transfer circuit 70 (dotted outline) serves to transfer data extracted by the data extraction circuit 66 of the protocol engine 64 to the data insertion circuit 67 of the protocol engine engine 65. As will the more fully described hereinafter, this transfer process is selective in nature. A second transfer circuit 80 non-selectively transfers data extracted by the data extraction circuit 69 of the protocol engine 65 to the data insertion circuit 68 of the protocol engine 64.

It can thus be seen that in principal the message interceptor extracts the Level 3 information from MSUs received on the link channel 62A and selectively transfers that data to the link 63A for transmission to the SCP 50. In addition, Level 3 information contained in an MSU received over link channel 63B from the SCP, is transferred across for onward transmission over link channel 62B. The operation of the link portion 62 is maintained at link level (MTP Level2) by the protocol engine 64, this operation including the tracking of sequence numbers and reponsiveness to link status signal. Similarly, the operation of the link portion 63 is maintained at the link level by the protocol engine 65. LSSUs are also generally transferred across between the link portions by the transfer circuits 70 and 80.

Considering the transfer circuit 70 in more detail, the data extracted by the circuit 66 is supplied to a data register 71, this data in fact comprising both the data in field 41 of an MSU and the length indicator LI of the MSLI. The protocol engine 64 indicates the presence of new data in register 71 by the supply of a signal NEW to a selective action control circuit 72 of the transfer circuit 70. The selective action circuit 72 then examines the contents of the data register 71 and compares these contents against criteria pre-stored in a criteria store 73. These criteria which have been input into the store 73 over the LAN 54 from the work station 53 (see input "PROG" in FIG. 5), serve to identify particular messages that are not to be passed on to the SCP over the link channel 63A. Thus, if the contents of the data register 73 meet any one of the criteria stored in the store 73, the selective action control circuit 72 does not transfer these contents onward; in other words, the control circuit 72 acts to suppress the contents of selected MSUs. If none of the criteria stored in store 73 are meet, the control circuit 72 causes the contents of the register 71 to be passed to a buffer 74 for transfer to the data insertion circuit 67.

The selection criteria stored in store 73 may, for example, relate to one, or a combination, of the following data items:

the identity of the signalling point from which the message originated;

the identity of the intended destination signalling point of the message;

the identity of the communications user number being called;

the identity of a communications user number of a calling party;

a data type indicator indicating the type of data contained in other data items extracted from the same message,
Thus the selection criteria may be based on at least one of the following:

(a) a pre-selected value or range of values of a said data item, (b) a combination of data items with respective preselected values or range of values, (c) a preselected threshold number of messages received in unit time with data items meeting criteria according to one of (a) and (b) above, (d) a preselected threshold ratio determined over unit time between the number of messages meeting first criteria according to one of (a) and (b) and the number of messages meeting second criteria according to one of (a) and (b) above.

By way of example, a simple message suppression criteria would be to suppress all calls directed to a particular party; in this case, the selection criteria would be the intersection of a data type indicator indicating a call set-up (IAM) message with a data item having predetermined call party digits. In other words, the control circuit 72 would suppress any IAM message containing the specified called party digits.

A more complicated selection criterion would be to limit the number of new calls initiated in a moving time window from a particular party. For such more complicated selection criteria, the selective action control circuit 72 must keep various running totals. The keeping of such counts and any subsequent calculations based on such counts can be treated as actions consequent on certain basic criteria relating to data type and/or content being met, these consequential actions being stored along with the basic criteria in store 73.

It will be appreciated that the suppression of call set up (IAM) messages is to be preferred over the suppression of messages passed in respect of later stages of a call.

For connection-oriented sequences of MSUs, upon suppression of an MSU of such a sequence by the control circuit 72, it is preferable that an indication be returned to the originating signalling point indicating that the action intended or requested by the suppressed MSU has failed or been refused. Of course, this indication must be part of the existing set of messages that constitute appropriate responses for the suppressed MSU. In order to generate this response indication, a response circuit 76 is provided which when so requested by the control circuit 72, generates appropriate response data for inclusion in a return MSU to the originating signalling point. Elements of this response data, including the point code of the originating signalling point, are obtained by the response circuit 76 from the data register 71.

The assembled response data is output by circuit 76 to a buffer 87 forming part of the transfer means 80. The contents of the buffer 87 are passed in due course to the data insertion circuit 68 for inclusion in an MSU for transmission over the link portion 62B.

Whether or not the response circuit 76 is activated and the nature of the response to be sent, are items programmed into the store 73 along with the selection criteria. Thus, upon a particular criteria being met, the control circuit 72 checks the store 73 to see what response action, if any, is to be effected by the response circuit 76 and then instructs this circuit accordingly.

As already noted, the reception of an LSSU on link 62A results in an indication of this LSSU being output from the protocol engine 64. This LSSU indication is passed to a link status control circuit 75 which generally passes on the indication to the protocol engine 65 causing the latter to effect any appropriate state change and to output the corresponding LSSU on link 63A. In particular, SIB (Status Indicator Busy) LSSUs and SIPO (Status Indicator Processor Outage) are passed through in this way. However, when realignment of the link is required (because, for example, the sequence numbering has failed), then a different procedure is followed. More particularly, on an SIOS (Status Indicator Out of Service) LSSU being indicated to the circuit 75 as having been received on link 62A, not only is this indication passed on to the protocol engine 65 to cause an SIOS LSSU to be sent out on link 63A, but the circuit 75 instructs the protocol engine 64 to send an SIE (Status Indicator Emergency Alignment Request) LSSU out on link 62B. A realignment process now commences on link portion 62 during which the link status control circuit 75 does not pass on any LSSU indications to the protocol engines 65. In due course, a SIN (Status Indicator Normal) LSSU will be received on link 62A and the circuit 75 responds by causing the protocol engine 65 to transmit an SIE LSSU to initiate alignment on the link portion 63.

The transfer of LSSU between link portions 63B and 62B is effected in substantially the same manner by a link status control circuit 85 that forms part of the transfer circuit 80.

In addition to the control circuit 85, the transfer circuit 80 comprises a buffer 84 for receiving MSU data (including length indicator) from the data extraction circuit 69, the buffer 87 for response data from the response circuit 76, and a multiplexer 88 for passing the contents of the two buffers 87, 88 in an orderly manner to the data insertion circuit 68. Thus, the transfer circuit 80 simply transfers across MSU data from link portion 63B to link portion 62B whilst permitting response data to be sent out over link portion 62B.

Figure 6:
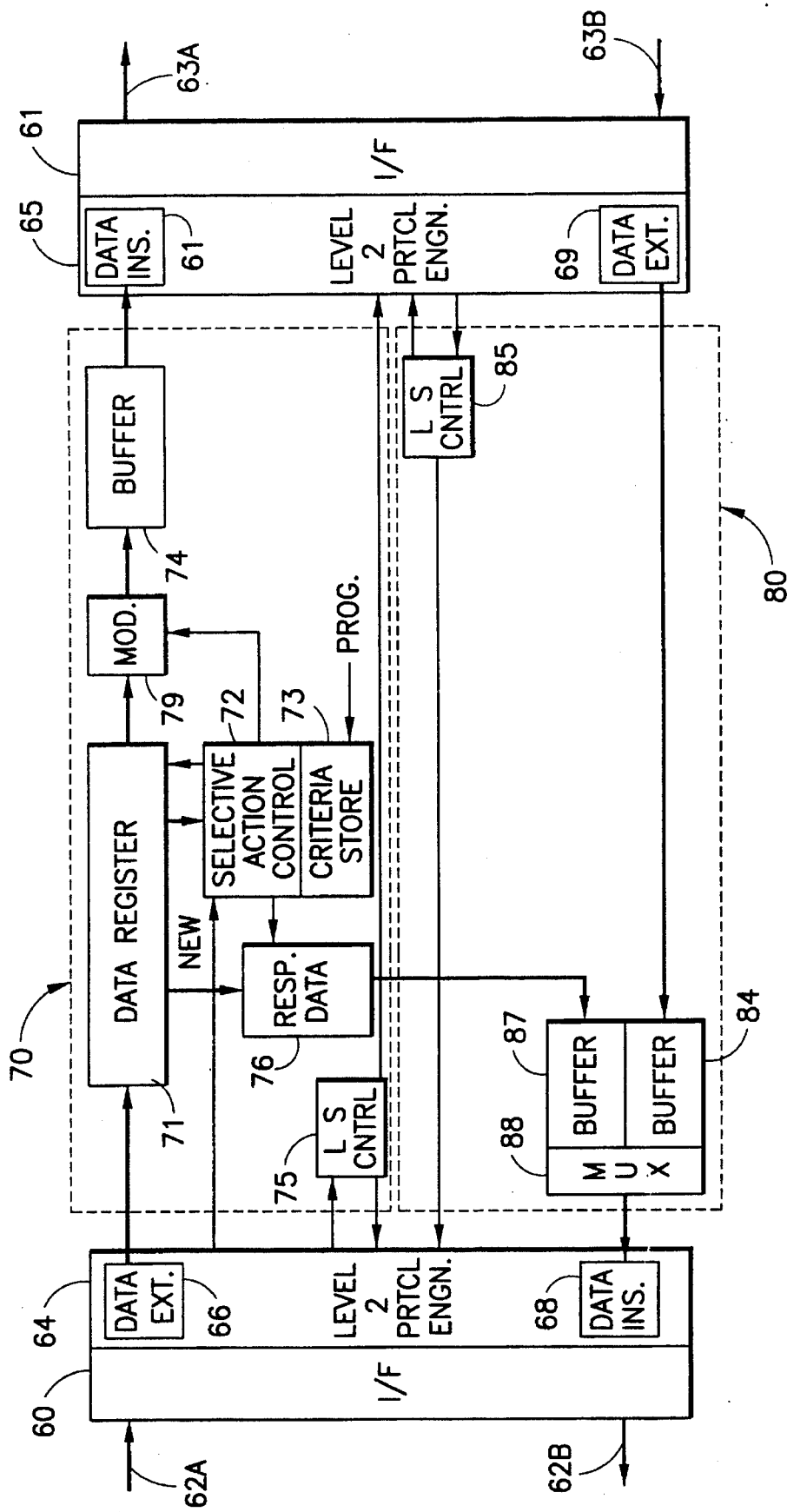
FIG. 6 is a functional diagram of a second form of the message interceptor intended to modify selected signal units passing in one direction along a link.

FIG. 6 shows a second form of the message interceptor 52 which is similar to the first form shown in FIG. 5 but additionally comprises a data modification circuit 79 interposed between the register 71 and buffer 74 in the transfer circuit 70. The purpose of the modification circuit 79 is to effect modification of MSU data transferred out of the register 71 to the buffer 74; such modification may, for example, be a syntax translation for ensuring that queries to a database held at SCP 50 are in the correct format for the database (thus, the circuit 79 may translate from ASN. 1 to the specific syntax of the database). Generally not all MSU dam transferred by the transfer circuit 70 will require modification (as, for example, not all MSUs will be database queries requiring syntax translation). The operation of the modification circuit 79 is therefore selective, this being achieved by controlling the operation of the circuit 79 from the selective action control circuit 72 such that only MSU data meeting particular criteria held in store 73 is modified.

It is possible to arrange for the modification circuit to effect different forms of modification on different types of MSU; again, this is controlled by the circuit 72 with the criteria stored in store 73 each having an associated indication of what action is to be performed upon the criteria being met.

It will be appreciated that the transfer circuit 70 may still be arranged to suppress certain MSU data, the requirement for this action being stored along with the corresponding selection criteria in store 73.

Figure 7:
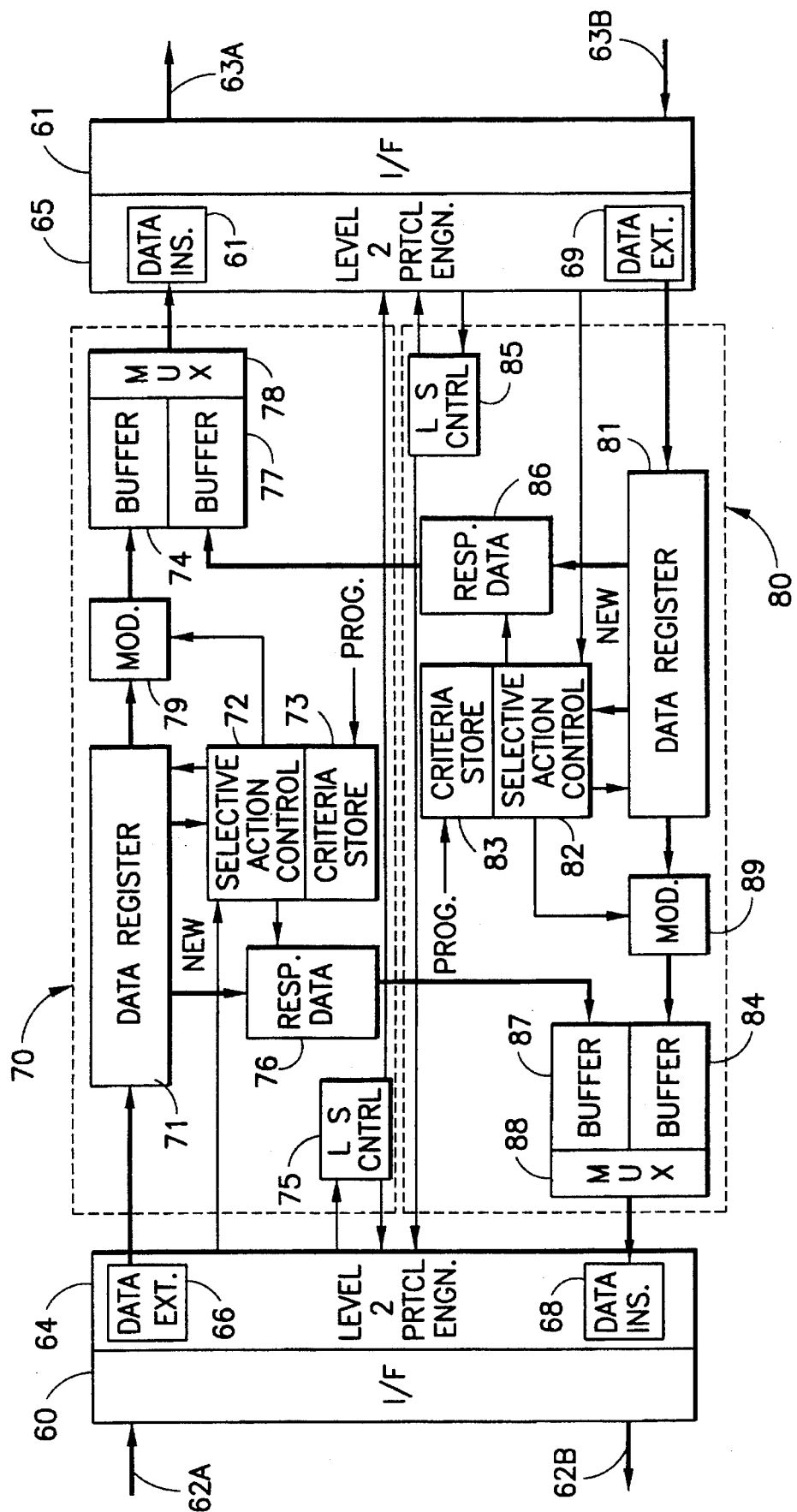
FIG. 7 is a functional diagram of a third form of the message interceptor intended to selectively remove or modify signal messages passing in either direction along a link.

FIG. 7 shows a third form of the message interceptor 52. This form of the interceptor is similar to the second form shown in FIG. 6 but now the transfer circuit 80 is also arranged to selectively suppress/modify data received over link portion 63B. To this end, the transfer circuit 80 is provided with a data register 81, a selective action control circuit 82, a programmable criteria store 83, a response circuit 86, and a data modification circuit 89, all of substantially the same form and functionality as the corresponding elements 71, 72, 73, 76 and 79 of the transfer circuit 70. The transfer circuit 70 is additionally provided with a buffer 77 to receive response data from the response circuit 86, and a multiplexer 78 to appropriately service the two buffers 74, 77.

The FIG. 7 form of message interceptor 52 is particularly useful where it is desired to effect a symmetrical modification of certain MSU data entering and leaving a particular signalling end point. Such a symmetrical modification could be the encryption of outgoing data to particular signalling points and the decryption of incoming data from those signalling points.

The forms of message interceptor 52 shown in FIGS. 5 to 7 are suitable for carrying out their function in a normally operating network. However, the message interceptor 52 should preferably also facilitate the operation of any recovery mechanisms provided by the network to deal with failure situations. In particular for an SS7 network, if one portion of the link in which the message interceptor is inserted should fail thereby causing failure of the overall link between the signalling points concerned, it should be possible for the MTP level 3 changeover mechanisms in these signalling points to operate efficiently to establish a new communication path between the signalling points using a different link (generally a different link of the link set between the signalling points).

In the case of a standard link (that is, one not including a message interceptor 52) failure of the link is detected by the signalling points at either end of the link and these signalling points then proceed to initiate a changeover procedure in which they attempt to divert the affected trafic to alternative signalling links. The changeover procedure executed by a signalling point involves the sending of an MTP level 3 changeover message that actually includes level 2 information, namely the FSN of the last successfully received MSU on the failed link. This information enables the signalling point at the other end of the failed link to determine which MSUs have to be re-sent whilst avoiding re-transmission of MSUs successfully received but not yet acknowledged.

To understand what may happen in the event of the failure of a link including a message interceptor 52, consider again the message interceptor 52 inserted in link 51A in FIG. 4. With the network operating normally the message interceptor 52 may have acknowledged the successful receipt over link portion 62 of a particular MSU from STP 48, this acknowledgement taking the form of the return of the FSN of the received MSU in the BSN of a signalling unit being sent to STP 48, the corresponding BIB being appropriately set to indicate successful receipt. Receipt of the acknowledgement by the STP 48 results in the acknowledged MSU being removed from the retransmission buffer in STP 48. Provided link portion 63 does not fail, the data extracted from the received MSU will in due course be passed over the link portion 63 to SCP 50; note, however, that the FSN of the MSU carrying the data in the link portion 63 may well differ from the FSN of the MSU that carried the data on link portion 62.

Assume now that link portion 63 fails before the particular data extracted from the acknowledged MSU on link 62 can be successfully sent on to SCP 50. The MTP mechanisms in SCP 50 will detect failure of link 51A.

The above scenario of failure of the link 51A including the message interceptor 52 raises three new considerations as compared to failure of a standard link. These new considerations are:

1) The message interceptor may hold the only copy of certain MSU data, namely data successfully passed on from one signalling point (STP 48) but not yet received by the other (SCP 50).
2) The link portion failure is only directly detectable by one of the signalling points.
3) Because the link actually involves two level 2 connections, the FSN seen by the signalling point at one end of the link in respect of an MSU carrying particular data, may not correspond to the FSN of the MSU received at the other end of the link that carries the same data. As a consequence, the FSN incorporated by a signalling point into any changeover message may not correctly identify to the other signalling point concerned, the last MSU successfully received by the first signalling point.

The first of these considerations may be handled by providing the message interceptor 52 with functionality for returning to the originating signalling point (here, STP 48) the MSU data that has been acknowledged but not successfully passed on; this data can then be re-routed to its intended destination according to documented SS7 procedures. The second consideration can be handled by providing the message interceptor 52 with functionality for forcing failure of the link portion that did not fail (link portion 62) upon the message interceptor 52 detecting failure of the other link portion (but after the return of any data as envisaged in the preceding paragraph). This forced link failure will then be detected by the signalling point not directly connected to the initially failing link portion.

The third consideration (possible FSN discrepancy in changeover messages) can be handled in several ways. Thus, it would be possible simply to overlook the discrepancy and allow higher level correction mechanisms to operate if any data is missing because too high an FSN has been included in a changeover message. However, it is generally preferable to take action to deal with any FSN discrepancy.

One approach would be to arrange for the changeover messages sent by a signalling point to include the correct FSN when sent out; for example, the changeover message sent by STP 48 in FIG. 4 upon failure of link 51A could be arranged to include the FSN of the MSU on link portion 63 that carried the data which was subsequent included in the last MSU successfully received by STP 48 over the link portion 62. To achieve this requires a translation between the FSN of the last successfully received MSU on link portion 62 and the FSN of the corresponding MSU on link portion 63. The information necessary to effect this translation can be collected by the message interceptor 52 in link 51A and the required translation can then be effected on request from a signalling point (assuming an appropriate communication path is available).

However, such an approach is not preferred as it would require the provision of special routines in the signalling points (STP 48, SCP 50).

Nevertheless, in the case where all routing-table routes between the signalling points at the ends of the failed link include a message interceptor 52, the translation information collectable in the message interceptors can be used to correct the FSN included in the changeover messages without requiring any change to the signalling points 48, 50. In particular, by providing a high-speed link between the message interceptors and having these interceptors intercept any changeover messages, the signalling point 48 (for example) can be left to send out its changeover message with a possibly-erroneous FSN; upon this changeover message being intercepted by one of the message interceptors, that interceptor will swap the FSN it finds in the changeover message for the corresponding translated FSN obtained by interrogating, over the highspeed link, the appropriate message interceptor containing the necessary translation information. The changeover message is then sent on by the intercepting message interceptor.

In fact, rather than providing a message interceptor 52 with the specific functionalities described above for handling link-failure, it is preferred to treat the message interceptor as a signalling point in its own right, albeit a relatively simple one, with the message interceptor being allocated its own point code. By doing this, the message interceptor can be provided with standard MTP level 3 mechanisms for dealing, inter alia, with link failure. A consequence of this approach is, of course, that each message interceptor is no longer transparent but has visibility on the signalling network, particularly to the signalling points at either end of the link 51A in which it is inserted as the routing tables in these signalling points will contain reference to the point code of the message interceptor. It may also be noted that in this context the link portions 62, 63 are links in their own right (though conceptually, so far as the main functioanlity of the message interceptor is concerned, the links 62, 63 still form an overall link 51A).

With this approach, failure of link portion 62 or 63 corresponds to failure of a standard network link and traffic diversion occurs in standard manner.

Figure 8:
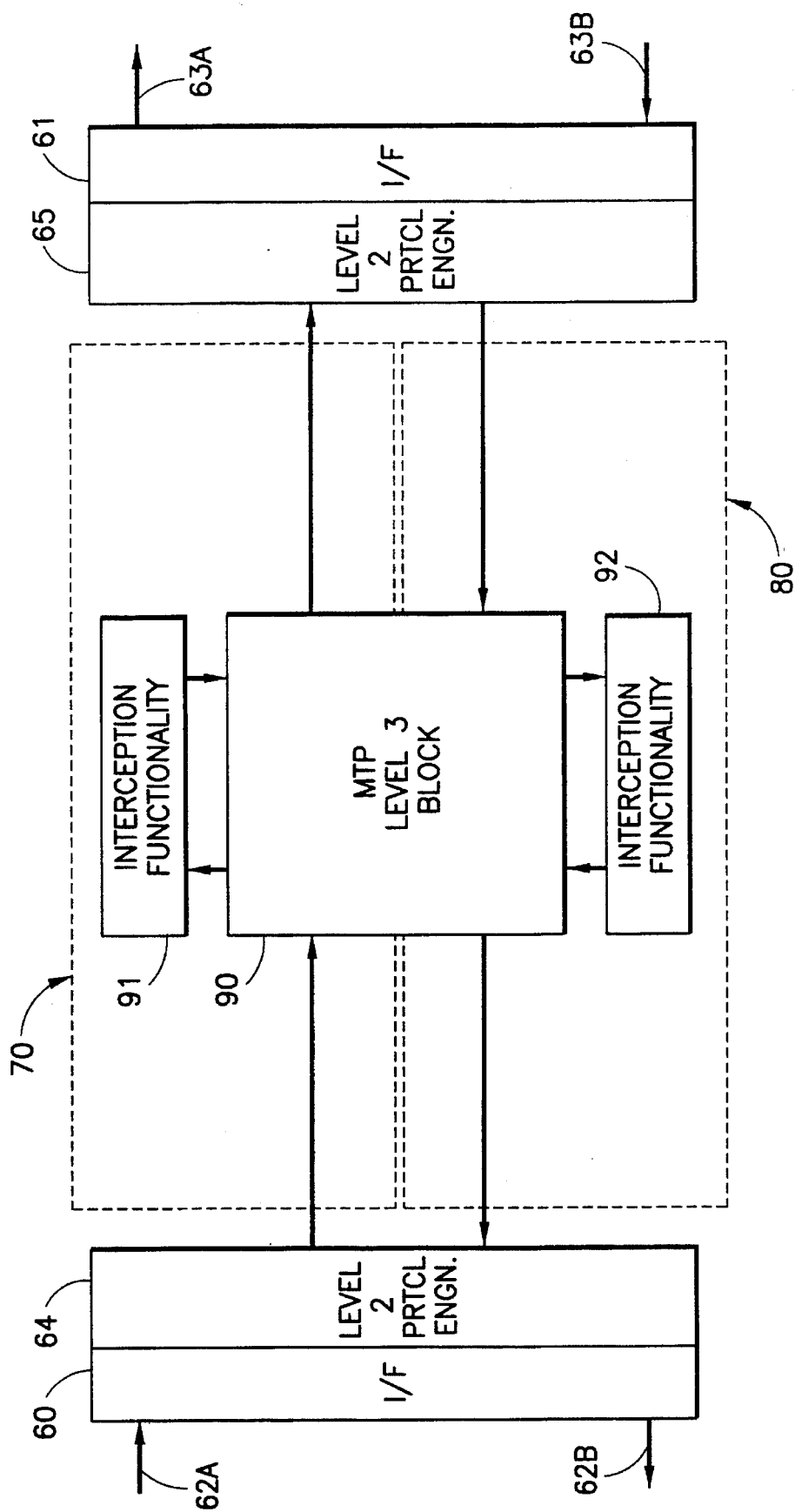
FIG. 8 is a functional diagram of a fourth form of the message interceptor provided with SS7 level 3 functionality.

FIG. 8 shows the general form of a message interceptor provided with MTP level 3 mechanisms for dealing with link failure. In the FIG. 8 interceptor, the output from the level-2 protocol engines 64, 65 is fed to MTP level-3 functionality (block 90), this output including both MSU data and link status information from the protocol engines 64,65. MSU data related to signalling network management and maintenance is identified (Service Indicator value less than 3) and handled entirely within the MTP level-3 block 90, this data being acted upon if addressed to the message interceptor itself as indicated by a match between the destination point code in the routing label and the signalling point code allotted to (and stored by) the message interceptor. MSU data related to higher levels is passed up to the interception functionality - block 91 for transfer circuit 70 and block 92 for transfer circuit 80. These blocks 91,92 contain the message interception functionality corresponding to that described above in relation to the forms of message interceptor shown in FIGS. 5 to 7. Each block 91/92 selectively acts on the data it receives and, where appropriate, then passes data (which may include response data) back to the MTP level-3 block 90 for transmission to the appropriate destination.

As already noted, network monitoring and maintenance are effected in the MTP level-3 functionality. In particular, should one link 62,63 fail, the block 90 will be informed by the relevant level-2 protocol engine and will take appropriate action in standard manner.

It will be appreciated that the FIG. 8 form of message interceptor still provides the benefits sought, namely relieving the other signalling points (the signalling points providing normal signalling network functionality) of certain tasks and undue traffic loading. Given the network visibility of the FIG. 8 message interceptor, it would be possible to add in signalling network functionality to the interceptor; however, this approach is not preferred as it detracts from one of the main benefits of providing the message interceptor—namely, enabling those signalling points tasked with signalling network functionality to carry out that functionality without expending processing power on dealing with load control.

It will be further appreciated that FIGS. 5 to 8 are schematic functional representations of the four forms of message interceptor 52 and that particular implementations may differ in detail. Thus, for example, rather than MSU data being moved from the data extraction circuit 66, into the register 71, on into the buffer 74, and finally transferred to the data insertion circuit 61, it is more practical to store the data in a particular memory location and then operate on pointers to that location. Furthermore the transfer circuits 70, 80 and, in the case of the FIG. 8 implementation, the MTP level 3 mechanisms and the interception functionality will generally all be implemented in software according to standard techniques.

Although the message interceptor 52 has been described in relation to an SS7 signalling network, it will be appreciated that the message interceptor could be arranged to operate with other, similar, signalling networks. In particular, it is possible to vary the physical and link levels from that generally specified for an SS7 network. Thus the message interceptor may be applied to a signalling network in which the basic link transport mechanism is based on ATM technology, the higher levels still being SS7 conformant.

We claim:

1. A message interceptor for a communications signalling network of the type comprising a plurality of signalling points interconnected by bi-directional point-to-point links over which messages are passed to transfer data between the signalling points, the passing of messages over each said link being effected in accordance with a link-level protocol; the message interceptor being intended for insertion in a link between a first and a second signalling point and comprising:

a first link interface for interfacing with a first portion of said link that connects with said first signalling point, a first link-level protocol engine connected to said first link interface for implementing said link-level protocol in respect of messages exchanged with said first signalling point over said first link portion, said first link-level protocol engine having means for extracting data carried in messages received from said first signalling point and means for incorporating other data into messages for sending to said first signalling point, a second link interface for interfacing with a second portion of said link that connects with said second signalling point, a second link level protocol engine, connected to said second link interface for implementing said link-level protocol in respect of messages exchanged with said second signalling point over said second link portion, said second link-level protocol engine having means for extracting data carried in the messages received from said second signalling point and means for incorporating other data into messages for sending to said second signalling point, first transfer means for transferring data extracted by said first link-level protocol engine to said second link-level protocol engine for incorporation into messages, and second transfer means for transferring data extracted by said second link-level protocol engine to said first link-level protocol engine for incorporation into messages at least one of said transfer means including storage means for storing predetermined selection criteria, and selective-action means for effecting at least one of the following actions:

modification of particular data being transferred between protocol engines, inhibiting transfer of particular data between said protocol engines, said selective-action means being responsive to the data to be transferred by transfer means to effect said action only on data meeting a corresponding selection criterium held in said storage means.

2. A message interceptor according to claim 1, wherein said selective-action means of said at least one transfer means can effect both the actions of modification and inhibiting, each said selection criterium having one of said actions associated therewith, which action is effected by the selective-action means upon said criterium being met.

3. A message interceptor according to claim 1, wherein only said first transfer means includes said storage means and selective-action means and said selective-action means is effective to perform only said suppression action.

4. A message interceptor according to claim 1, wherein both said first and second transfer means include said storage means and selective-action means and said selective-action means is effective to perform at least said modification action.

5. A message interceptor according to claim 1, wherein said data extracted by the said protocol engines from at least some of the messages received thereby comprises at least one of the following data items:

identity of a signalling point from which the message originated;

identity of an intended destination signalling point of the message;

identity of a communications user number being called;

identity of a communications user number of a calling party;

a data type indicator indicating a type of data contained in other data items extracted from the message, said selective-action means performing said suppression action on data extracted from messages with data items meeting selection criteria based on at least one of the following:

(a) a pre-selected value or range of values of said data item, (b) a combination of data items with respective preselected values or range of values;

(c) a preselected threshold number of messages received in unit time with data items meeting criteria according to one of (a) and (b) above, (d) a preselected threshold ratio determined over unit time between a number of messages meeting first criteria according to one of (a) and (b) and a number of messages meeting second criteria according to one of (a) and (b) above.

6. A message interceptor according to claim 1, wherein said selective-action means performs said suppression action on data constituting a call set-up request whilst allowing transfer of data relating to on-going calls, the selective-action means suppressing said call setup request data only upon such data meeting at least one other said selection criterium.

7. A message interceptor according to claim 1, where said data carried by certain of said messages is request data specifying a request to which a response is expected, the request data including an identifier of a signalling point placing the request data on the signalling network, said selective-action means effecting said suppression action upon one of said selection criterion being met that relates to said request data, said selective-action means including means operative in an event of said request data being suppressed, to pass response data to a link-level protocol engine providing the request data, the response data indicating that the request has not been met and including said identifier, and said protocol engine receiving the response data and incorporating it in a message, the destination of which is set to the signalling point identified by said identifier.

8. A message interceptor according to claim 7, wherein said request data is call set-up request data.

9. A message interceptor according to claim 1, wherein said data carried by said messages includes link control data relevant to operation of the link carrying the messages, said transfer means being such that said link control data is passed between said protocol engines without modification or suppression.

10. A message interceptor according to claim 4, wherein the modification action effected by said selective-action means of the first transfer means is encryption and the modification action effected by said selective-action means of the second transfer means is decryption.

11. A message interceptor according to claim 10, wherein the selection criteria associated with the first and second transfer means are such that data relating to link control and message routing is not subject to modification action by said selective-action means.

12. A message interceptor according to claim 1, wherein the said selective-action means effects a modification action involving data syntax translation in respect of data identified by said selection criteria.

13. A message interceptor according to claim 1, wherein said storage means is programmable and includes an external interface enabling said selection criteria to be downloaded into the storage means together with an indication of the associated action to be taken, where more than one action is performable by said selective-action means.

14. A message interceptor according to claim 1, wherein said transfer means includes means storing a signalling point code identifying the message interceptor as a signalling point of said signalling network, and means for providing network-level functions to the message interceptor.

15. A message interceptor according to claim 14, wherein the interceptor is intended to operate with a signalling network compliant with at least SS7 level 3, said means for providing network-level functions comprising level-3 means for providing SS7 level 3 functions, said data extracted by each said link-level protocol engine being passed to said level-3 means and the latter serving to pass on to the selective action means data concerned with SS7 levels above level 3.

16. A communications signalling system of the type referred to in claim 1, at least one said signalling point having a respective associated message interceptor according to claim 1, inserted in each of the links connecting with that signalling point.

17. A communications signalling system according to claim 16, wherein the selection-criteria storage means of message interceptors are programmable, the system including a common programming means for programming the same selection criteria into the storage means of all the message interceptors associated with a same signalling point.

* * * * *